April 17, 1928.

M. ANDIS 1,666,588

ELECTRIC MOTOR

Filed June 26, 1926

INVENTOR.

Matthew Andis

BY Erwin Wheeler y Woolard

ATTORNEYS

Patented Apr. 17, 1928.

1,666,588

UNITED STATES PATENT OFFICE.

MATHEW ANDIS, OF RACINE, WISCONSIN.

ELECTRIC MOTOR.

Application filed June 26, 1926. Serial No. 118,676.

This invention relates to improvements in electric motors, with particular reference to motors which are intended to develop light power under circumstances where considerations of size and weight are important.

Objects of this invention are to provide an efficient, diminutive electric motor, adapted for use in hollow tool handles and for other purposes where manual manipulation of the motor itself is required; to provide such a motor with a unitary field magnet having two poles which may be in alignment with the axis of the casing or container, whereby the transverse dimensions may be reduced to a minimum; to provide such a motor with an armature composed of a single piece of metal, or a series of laminated sheets, so formed that the lines of force from the two field poles will follow a progressively shortening path with increasing density during each impulse or current wave through the motor; to provide a simple and inexpensive two pole motor which may be operated by either an alternating or a direct current; to provide a diminutive motor which will operate through long periods without material increase in temperature; to provide simple and efficient starting mechanism for such a motor; to provide a motor structure which can be mounted in the hollow handle of a tool and controlled by the thumb of the hand that grasps such handle while the tool is in operation; to provide a circuit breaker or vibrator for such a motor which can be controlled as to speed while the motor is in operation, to correspondingly control the speed of the motor; and to provide such a motor capable of utilizing both alternate and direct current.

In the accompanying drawings, my invention is illustrated as embodied in the handle of a hair clipper, which is fully illustrated and described in a companion application bearing even date herewith, and it is an object of this invention to provide a motor adapted to be contained in such a handle and which may be used to operate a hair clipper or other tool requiring correspondingly light power and high speed under conditions which require an adaptation of the motor in some instances for use with direct current and in other instances for use with alternating current.

In the drawings.

Like parts are identified by the same reference characters throughout the several views.

Figure 1:
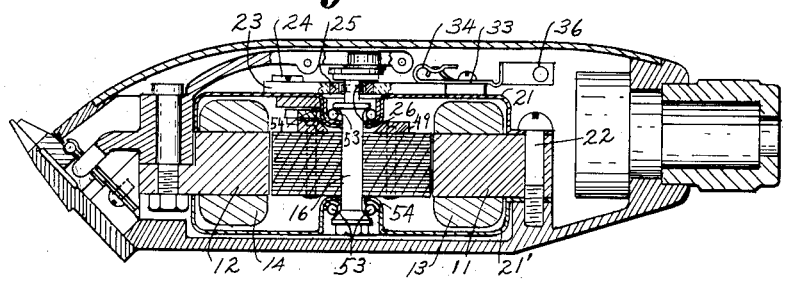
Figure 1 is a central, longitudinal, sectional view of a hair clipper provided with a motor embodying my invention, drawn to a plane perpendicular to the clipper blades.

The field magnet is unitary and comprises a generally rectangular or somewhat oval shaped frame 10 of magnetizable material. The end members of the frame have inwardly projecting pole pieces 11 and 12 which are wound in series, the coils 13 and 14 being connected by the conductor 15, as conventionally indicated in Figure 5. The inner ends of the pole pieces are cylindrically curved in an arc concentric to the axis of the motor shaft 16.

The armature is preferably of a generally S-shaped form, the central portion 17 of which is secured to the motor shaft 16 with its ends curved in the direction of armature rotation and provided with polar arms 18 and 19 which have arcuate outer margins concentric to the axis of the motor shaft and revoluble in close proximity to the arcuate or cylindrically curved ends of the field poles 11 and 12. Each of the polar arms 18 and 19 extends reversely from the point of its connection with the associated end of the portion 17 and each arm is preferably tapered toward its free end, there being a wide gap between its inner margin and the portion 17.

The armature may comprise a single piece of metal or, if desired, it may be composed of a series of laminated sheets as indicated in Figure 1. No winding is used. As the armature rotates, the lines of force from the respective field poles will first enter the armature pole pieces at their free extremities and the magnetic pull will continue the rotation of the armature, the lines of force progressively shortening and increasing in intensity until they are able to follow a substantially straight path through the portion 17 from one field pole to the other. At this time, the portions 20 of the armature are in approximate registry with their respective field poles. If a continuous current is being used, the circuit is then interrupted by a circuit breaker, as hereinafter described, the armature de-energizes and rotates by momentum until the free ends of its arms 18 and 19 are each brought into proximity to the opposite field pole. Thereupon the circuit is again closed and the field magnet energized for a further magnetic pull, which continues the armature in rotation.

A cap plate 21 and a bottom plate 21', each of non-magnetizable material, are secured to the field frame by screws 22 and provided with anti-friction journals for the motor shaft 16. A circuit breaker lever having a non-conducting portion 23 is pivoted to the cap plate at 24 and provided with an aperture having a metallic bushing 25 through which the motor shaft 16 extends. A cam 26 is secured to the motor shaft and the aperture in the bushing is large enough to receive this cam. The cam has two diametrically opposite high spots or cam projections 27 which are adapted to bear upon an eccentric portion 28 of the wall of the bushing to actuate the lever while the cam projection is pressing against this surface. A flat spring 29 has one end secured to the cap plate at 30 and its opposite end portion 31 is reversely bent and engaged in a recess 32 formed in the portion 23 of the vibrator lever, whereby the spring may be adjusted to urge the lever in a direction opposite to that in which it is actuated by the cam. The vibrator lever carries a terminal arm 33 provided with a binding post 34 for the attachment of the circuit wire 35 and also having a contact terminal 36 adapted to bear against a relatively fixed contact terminal 37 secured to, or insulated from, the cap plate 21 and to which the other conducting wire 38 is attached, these wires being in the circuit of the motor.

The spring 29 has a curved portion 40 terminating in angular bends 41 and 42. A controlling lever 43 has its inner end forked and engaged with a pivot stud 44 depending from the under side of the cap plate 21, the head of the stud supporting this end of the lever. The outer end of the lever is pivotally connected at 45 with a dog 46 having one arm 47 extending laterally from underneath the cap plate to a position where it may serve as an actuating arm. The other arm of the dog carries a tooth 48 adapted to engage a ratchet wheel 49 on the motor shaft, whereby a swinging movement of the dog in one direction will cause the tooth 48 to engage the ratchet wheel 49 to rotate the latter and start the motor. This movement of the dog is transmitted to the control lever 43 through the pivot pin 45, and a stud 50 projecting upwardly through an arcuate slot 51 in the cap plate 21 travels along the curved portion 40 of the spring to the angular bend 42, in which position the reversely bent portion of the spring tends to hold the vibrator lever with the terminals or contact points 36 and 37 in pressure relation to each other, subject to momentary separation when the cam projections 27 engage the flat or eccentric portion 28 of the bushing 25. The cam will of course be so positioned on the motor shaft that this separation of the contact points will occur at the proper time,—i. e.,—just before the armature poles commence to move away from the field poles with which they are in registry.

Figure 2:
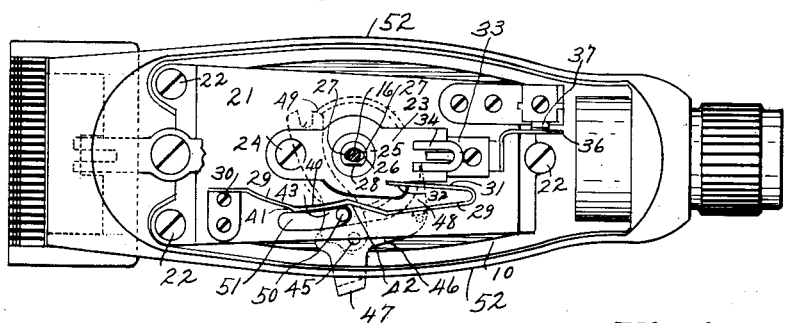
Figure 2 is a plan view of the same with the blade operating connections removed to expose the vibrator, its actuating connections, and the starting mechanism.
Figure 3:
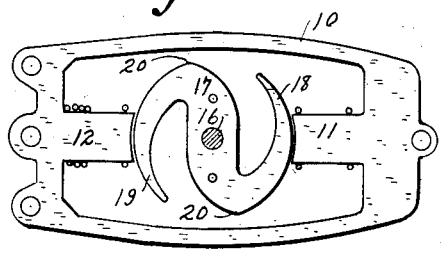
Figure 3 is a detail view of the field magnet and armature.
Figure 4:
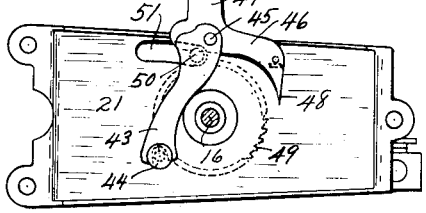
Figure 4 is an inverted plan view of the cap plate and starting mechanism.

After the motor has been started, the controller lever 43 may be swung backwardly from its starting position, the pivot stud 50 traveling along the curved portion 40 of the spring to increase the length of the vibratory end portion of the spring and the curve may be such as to also vary the tension of the spring and allow a wider separation of the contacts, thereby reducing the speed of the motor. If this retractive movement is carried far enough, the spring will allow the contact points 36 and 37 to remain separated, in which case the motor will stop. This will occur when the stud 50 registers with the angular bend 41. It will be observed in Figure 2 that the dog actuating arm 47 extends through a slot in the handle or enclosing shell 52 of the hair clipper. When this handle is grasped by the right hand of the operator, his thumb will be in a position to actuate the arm 47, whereby the operator will be able to start and stop the motor or to control its speed while manipulating the clipper or other tool operatively connected with the motor.

The specific shape of the motor frame will of course depend upon the form of the shell 52. It will ordinarily be found advisable to employ an elongated motor frame with its field poles aligned with the axis of the handle, or shell 52, thereby avoiding the necessity of providing handles of excessive width.

By employing top and bottom plates 21 and 21' which contain bearings for the motor shaft, the motor is made to comprise a unit adapted to be mounted in a great variety of installations other than in the hollow handle of the illustrated hair clipper. The plates 21 and 21' preferably have inwardly indented portions or cup shaped depressions in which ball races are mounted to receive sets of balls 53 between them and the ball race flanges 54 on the motor shaft.

A motor constructed as herein described will operate indefinitely without a material rise in temperature. It is therefore possible to use the shell 52 as a handle without having its temperature raised materially above the blood temperature of the operator. Also, this motor will run with substantially the same efficiency if an alternating current is used. I have discovered that it will automatically adjust itself to the frequency of such currents and that an alternating current can be used with the vibrator in operation or with the motor circuit continuously closed. This motor is therefore adapted for general commercial use without regard to the character of the current.

Figure 5:
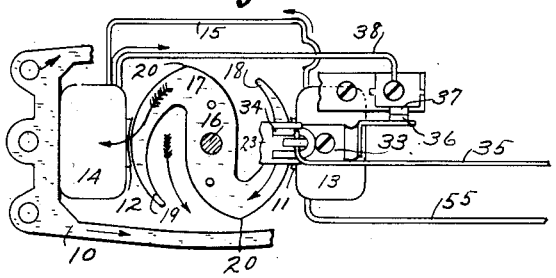
Figure 5 is a fragmentary view of the motor and its circuit breaker associated with a wiring diagram.

As shown in Figure 5, the motor circuit is completed from the line 55 through the field windings 13 and 14, wire 38, fixed and movable contacts 37 and 36 and arm 33 to line 35.

I claim:

1. An electric motor having a unitary bipolar field magnet frame provided with two pole pieces extending inwardly from its respective ends and wound in series, an unwound instantly demagnetizable armature bar having at each end a single polar arm extending in the direction of rotation and having an arcuate outer margin in a circle concentric to the axis of rotation and of a diameter nearly equal to the distance between the field poles, said arcuate margin extending from a point substantially in the axis of the bar to a point substantially 135° distant therefrom in said circle of rotation, and a circuit breaker operatively connected to be actuated by the armature to momentarily interrupt the outer circuit when the axis of the armature bar and field poles are substantially aligned, said circuit breaker being adapted to again close the circuit after permitting a sufficient rotation of the armature by momentum to establish a reverse flux path through the extremities of the polar arms, said armature in material and in mass being self-tuning to the frequency of an alternating electric current whereby the same may be operated by a continuous current by the aid of the circuit breaker and by an alternating current independent of the circuit breaker.

2. An electric motor having a unitary field magnet frame provided with pole pieces with opposite polarity, an unwound instantly demagnetizable armature bar having at each end a single arcuate polar arm each extending from the axis of the bar in the direction of rotation, said polar arms being each of a length insufficient to span the gap between one pole and the next but of sufficient length to permit the establishment of a reversed flux path through said armature after the circuit is momentarily interrupted by a circuit breaker substantially at the time of alignment of the armature axis with that of diametrically opposite field poles, said armature being adapted (in material and weight) to continue its rotation during momentary interruptions caused by the circuit breaker and to be self-tuning to an alternating current independently of the circuit breaker, whereby the motor may be operated by either direct or alternating current.

3. In an electric motor, the combination with a unitary field frame having inwardly extending, oppositely disposed, pole pieces wound in series, of a motor shaft provided with an armature comprising a flat piece of metal having polar extremities adapted to provide a flux path across the armature from the field poles, which progressively shortens as the armature rotates, a cam on the motor shaft, and a circuit breaker for the motor circuit adapted to be actuated by the cam when said flux path through the armature is substantially equal to the distance between the field poles, said circuit breaker including a vibratory arm, a spring adapted to urge the arm to circuit closing position when released by the cam, and a controlling lever adapted to bear upon the spring at an intermediate point to vary its tension and effective length.

4. An electric motor, comprising the combination with a unitary field frame having pole pieces of opposite polarity at its respective ends, a centrally mounted armature shaft perpendicular to the plane of the field frame, an armature bar fixed to the shaft and adapted to revolve in the space enclosed by the field frame, a cap plate of non-magnetizable material covering said space at one side of the field frame, a circuit breaker mounted on the cap plate in controlling relation to the motor circuit, a cam on the motor shaft for actuating the circuit breaker in one direction, and a spring for actuating it in the other direction.

5. An electric motor, comprising the combination with a unitary field frame having pole pieces of opposite polarity at its respective ends, a centrally mounted armature shaft perpendicular to the plane of the field frame, an armature bar fixed to the shaft and adapted to revolve in the space enclosed by the field frame, a cap plate of non-magnetizable material secured to one side of the field frame, a circuit breaker for the motor circuit mounted thereon, and means controlled by the armature for actuating the circuit breaker to break the motor circuit as the ends of the armature pass the field poles.

6. An electric motor, comprising the combination with a unitary field frame having pole pieces of opposite polarity at its respective ends, a centrally mounted armature shaft perpendicular to the plane of the field frame, an armature bar fixed to the shaft and adapted to revolve in the space enclosed by the field frame, a cap plate of non-magnetizable material secured to one side of the field frame, a circuit breaker for the motor circuit mounted thereon, and means controlled by the armature for actuating the circuit breaker to break the motor circuit as the ends of the armature pass the field poles, a controlling lever pivoted to the cap plate and adapted to regulate the circuit closing movements of the circuit breaker.

7. An electric motor, comprising the combination with a unitary field frame having pole pieces of opposite polarity at its respective ends, a centrally mounted armature shaft perpendicular to the plane of the field frame, an armature bar fixed to the shaft and adapted to revolve in the space enclosed by the field frame, a cap plate of non-magnetizable material secured to one side of the field frame, a circuit breaker for the motor circuit mounted thereon, means controlled by the armature for actuating the circuit breaker to break the motor circuit as the ends of the armature pass the field poles, a controlling lever pivoted to the cap plate and adapted to regulate the circuit closing movements of the circuit breaker, and a motor starter carried by the controlling lever.

8. An electric motor, comprising the combination with a unitary field frame having pole pieces of opposite polarity at its respective ends, a centrally mounted armature shaft perpendicular to the plane of the field frame, an armature bar fixed to the shaft and adapted to revolve in the space enclosed by the field frame, a cap plate of non-magnetizable material secured to one side of the field frame, a circuit breaker for the motor circuit mounted thereon, means controlled by the armature for actuating the circuit breaker to break the motor circuit as the ends of the armature pass the field poles, a controlling lever pivoted to the cap plate and adapted to regulate the circuit closing movements of the circuit breaker, and a motor starter carried by the controlling lever, said starter comprising a ratchet wheel on the motor shaft and a manually operable lever pivoted to the controlling lever and provided with a dog adapted to engage and actuate the ratchet wheel when said levers are moved in one direction.

9. An electric motor for use interchangeably with direct and alternating currents, provided with a ratchet wheel and a cam on the motor shaft, a circuit breaker for the motor circuit adapted to be actuated by the cam to circuit breaking position, when the armature poles are passing the field poles, means for automatically restoring the circuit breaker to circuit closing position, a manually operable dog for actuating said ratchet wheel, and a lever in controlling relation to the motor and supporting relation to said dog.

10. The electric motor herein shown and described, comprising the combination of a field frame of magnetizable material having inwardly projecting pole pieces wound in series, an armature revoluble in the plane of the field frame on a shaft perpendicular to such plane, a set of non-magnetizable plates secured to the opposing faces of the field frame and provided with antifriction bearings for the motor shaft, and means for starting and controlling the motor.

MATHEW ANDIS.